(12) United States Patent
Hopkins

(10) Patent No.: US 7,697,520 B2
(45) Date of Patent: Apr. 13, 2010

(54) SYSTEM FOR IDENTIFYING THE PRESENCE OF PEER-TO-PEER NETWORK SOFTWARE APPLICATIONS

(75) Inventor: Samuel P. Hopkins, Freedom, PA (US)

(73) Assignee: Tiversa, Inc., Cranberry Township, PA (US)

(*) Notice: Subject to any disclaimer, the term of this patent is extended or adjusted under 35 U.S.C. 154(b) by 540 days.

(21) Appl. No.: 11/599,828

(22) Filed: Nov. 15, 2006

(65) Prior Publication Data

US 2007/0078990 A1 Apr. 5, 2007

Related U.S. Application Data

(63) Continuation-in-part of application No. 11/103,818, filed on Apr. 12, 2005.

(60) Provisional application No. 60/736,794, filed on Nov. 15, 2005.

(51) Int. Cl.
 *H04L 12/28* (2006.01)
 *G06F 15/177* (2006.01)
 *G06F 15/173* (2006.01)
 *G06F 7/04* (2006.01)

(52) U.S. Cl. .................. 370/389; 370/346; 709/220; 709/224; 709/225; 726/26

(58) Field of Classification Search .................. 726/26
See application file for complete search history.

(56) References Cited

U.S. PATENT DOCUMENTS

| 6,668,289 | B2 | 12/2003 | Cheng et al. |
| 6,918,113 | B2 | 7/2005 | Patel et al. |
| 7,089,301 | B1 | 8/2006 | Labio et al. |
| 7,277,404 | B2 * | 10/2007 | Tanzella et al. ............. 370/310 |
| 7,318,092 | B2 * | 1/2008 | Sutler .......................... 709/223 |
| 2001/0003191 | A1 | 6/2001 | Kovacs et al. |
| 2002/0044549 | A1 | 4/2002 | Johansson et al. |
| 2002/0069098 | A1 | 6/2002 | Schmidt |
| 2002/0073204 | A1 | 6/2002 | Dutta et al. |
| 2002/0184310 | A1 | 12/2002 | Traversat et al. |
| 2003/0041141 | A1 * | 2/2003 | Abdelaziz et al. ........... 709/223 |
| 2003/0055892 | A1 | 3/2003 | Huitema et al. |
| 2003/0112974 | A1 * | 6/2003 | Levy ........................... 380/210 |
| 2003/0208621 | A1 | 11/2003 | Bowman |
| 2004/0030651 | A1 | 2/2004 | Kim et al. |
| 2004/0039921 | A1 | 2/2004 | Chuang |
| 2004/0044996 | A1 | 3/2004 | Atallah |

(Continued)

OTHER PUBLICATIONS

Findell, M., "Peer-to-Peer (P2P) Networking," On Line, 1-21 (2001).

(Continued)

*Primary Examiner*—Gregory B Sefcheck
*Assistant Examiner*—Jenkey Van
(74) *Attorney, Agent, or Firm*—Hamilton, Brook, Smith & Reynolds, P.C.

(57) ABSTRACT

A system and method for detecting peer-to-peer network software operating on a target computer. A target file is created, and placed in one or more folders on the target computer. A search is issued on a Peer-to-Peer network for the target file. Peer-to-peer software is detected to be operating on the target computer in accordance with results of the search.

34 Claims, 4 Drawing Sheets

U.S. PATENT DOCUMENTS

| | | | |
|---|---|---|---|
| 2004/0122958 | A1 | 6/2004 | Wardrop |
| 2004/0148434 | A1 | 7/2004 | Matsubara et al. |
| 2004/0153658 | A1 | 8/2004 | Gunyakti et al. |
| 2004/0162871 | A1* | 8/2004 | Pabla et al. ................. 709/201 |
| 2005/0044483 | A1* | 2/2005 | Maze et al. .............. 715/501.1 |
| 2005/0091397 | A1 | 4/2005 | Roberts et al. |
| 2005/0108557 | A1* | 5/2005 | Kayo et al. ................. 713/189 |
| 2006/0242121 | A1* | 10/2006 | DeVorchik et al. ............. 707/3 |
| 2006/0248062 | A1 | 11/2006 | Libes et al. |

OTHER PUBLICATIONS

Lindemann, C., et al., "A Distributed Search Service for Peer-to-Peer File Sharing in Mobile Applications," *Peer-to-Peer Computing, 2002, Proceedings of the Second International Conference on Peer-to-Peer Computing*, 5-7 (2002).

Oram A., "Peer-toPeer: Harnessing the Power of Disruptive Technologies," *Ch. 19 Interoperability Through Gateways*, 381-392 (2001).

Scarlata, V., et al., "Responder Anonymity and Anonymous Peer-to-Peer Files Sharing," *Proceedings of the International Conference on Network Protocols*, 272-280 (2001).

Xiao, L., et al., "Mutual Anonymity Protocols for Hybrid Peer-to-Peer Systems," *Proceedings of the 23rd International Conference on Distributed Computing Systems*, 19-22 (2003).

Zupeng, Li, et al., "Research of Peer-to-Peer Network Architecture," *Proceedings of ICCT*, 312-315 (2003).

Marmor, Michael, S., "Make the P2P Lead with Toadnode," www.webtecniques.com, 44-49 (2000).

Ueda, Kiyoshi, et al., "Peer-to-Peer Network Topology Control within a Mobile Ad-hoc Network," *2003 IEEE*, 243-247.

Liu, Jiangchaun, et al., "Distributed Distance Measurement for Large-Scale Networks," *Computer Networks*, 41:177-192 (2003).

Siu Man Lui and Sai Ho Kowk, "Interoperability of Peer-to-Peer File Sharing," *ACM SIGecom Exchanges*, 3(3):25-33 (2002).

Brandon Wiley, Freenet, "Inoperability Through Gateways," Chapter 19, 381-392.

Zhenyun Zhuang, et al. "Hybrid Periodical Flooding in Unstructured Peer-to-Peer Networks," Proceedings of the 2003 International Conference on Parallel Proceeding.

Steven Hessing, "Peer to Peer Messaging Protocol," Internet-Draft, 1-57 (2002).

\* cited by examiner

SYSTEM FOR IDENTIFYING THE PRESENCE OF PEER-TO-PEER NETWORK SOFTWARE APPLICATIONS

CROSS-REFERENCE TO RELATED PATENT APPLICATIONS

The application claims priority to U.S. Provisional Appl. No. 60/736,794, filed Nov. 15, 2005, entitled "System for Identifying the Presence of Peer-to-Peer Network Software Applications," and is a continuation in part of U.S. patent application Ser. No. 11/103,818 filed Apr. 12, 2005 entitled System for Detecting Peer-to-Peer Network Software. Both of the above-referenced applications are incorporated by referenced herein in their entirety.

FIELD OF THE INVENTION

The present invention provides a system for detecting whether or not a computer system is or could participate in a Peer-to-Peer network by searching for specific terms and detecting these terms, or the resulting files.

BACKGROUND OF THE INVENTION

Peer-to-Peer networks comprise multiple nodes, each node typically consisting both of file server and client which can send and receive data or "Communication messages" to or from a node to which such is connected and other nodes on the network. Common Peer-to-Peer networks and software applications are Gnutella, FastTrack, Edonkey, NeoNet, Kazaa, Limewire, Morpheus, Bear Share, Bit Torrent, Shareaza, Emule, and Freenet.

In a Peer-to-Peer network, each node is connected to other nodes over a communication medium such as the Internet either directly or through some type of proxy. For example, when a search request is issued such originating node sends a search request to all of the nodes to which it is connected. (See FIG. 1) These nodes search their list of available files and if a match is found they send a response back with the location. However, a Peer-to-Peer proxy network typically consists of node A which is connected to a node B and node B is connected to a node C. (See FIG. 2) Node A is not connected to node C such that if node A issues a search request it will be forwarded to node B and Node B will search its available files and if a match is found it will send a response back to node A. Node B will then forward node A's request to node C and Node C will search its available files and if a match is found it will send a response back to node B. Node B will then forward this response to node A. FIG. 3 discloses a nonproxy loop network wherein each node is directly connected to another.

Some Peer-to-Peer networks utilize a leaf node/main node proxy topology (see FIG. 4) where some nodes are classified as main nodes and the remaining nodes are classified as leaf nodes. Leaf nodes can only connect to main nodes. Only main nodes can connect to other main nodes. When a leaf node issues a search request it sends the request to the main node to which it is connected. The main node then forwards the request to any other leaf nodes that are connected to it and also to any main nodes to which it is connected. These main nodes forward the request to any leaf nodes that are connected to them.

A Peer-to-Peer network is used to share files among its users. They are commonly used to share and acquire copyrighted music, movies, ebooks, and software but can be used to share and acquire almost any other type of file. To access a Peer-to-Peer network, a user installs a Peer-to-Peer network software application that is capable of connecting to and utilizing the Peer-to-Peer network, much the same way that a user installs a web browser, such as Internet Explorer, to access the World Wide Web.

Organizations are placed at legal risk by Peer-to-Peer network usage by their employees if an employee installs a Peer-to-Peer network software application onto their work PC and utilizes the Peer-to-Peer network to acquire copyrighted works. Peer-to-Peer network usage also consumes a lot of network bandwidth because the commonly transferred files are large software and movie files. This places bandwidth burdens on an organization's computer network. Even though it is normally a violation of corporate policy to have a Peer-to-Peer network software application installed, employees still install these applications.

When installing a Peer-to-Peer network software application, the user must select a folder on their computer system in which to store any downloaded files. For the purposes of clarification, a "folder" is used to organize files on a computer system, also known as a "directory." Any files placed into this folder are also made available to other users. This folder is often called the "Shared Folder". For instance, if user #1 (on a first network node) places a file named "foofile" in their shared folder, user #2 (on a second network node) would then be able to access and download the file. Depending on the Peer-to-Peer network software application used, the user can also select additional folders to make available to other users of the network.

For whatever reason, users sometimes select as their shared folder a folder that contains sensitive information or information they do not otherwise wish to share or they may later begin to place sensitive information or information they do not otherwise wish to share into their shared folder by mistake. Usually this action is done by mistake and unknowingly by the user but sometimes it is done by a malicious person or virus. Sometimes the Peer-to-Peer network software application has a software bug that permits the sharing of files and folders that the user never intended to be shared. Unintended (or malicious) sharing of information may be detrimental the user, the organization they work for, or even to national security. It would therefore be advantageous to be able to locate computers with Peer-to-Peer network software applications installed so that such applications can be assessed or removed.

There are hundreds if not thousands of different Peer-to-Peer network software applications with each having its own set of attributes. Current detection methods concentrate on 1) identifying the presence of each of these different Peer-to-Peer network software applications on a computer system or 2) the placement of a hardware/software based inline filter between the computer system and Internet to detect Peer-to-Peer network communications by looking for their protocols, monitoring for downloads, or increased bandwidth usage.

As Peer-to-Peer network software applications are created or current ones change, detecting the presence of a specific Peer-to-Peer network software application on a computer system or monitoring for Peer-to-Peer network communication on the organization's network becomes increasing challenging.

The method of identifying the presence of Peer-to-Peer network software applications on a computer system entails creating a software "blueprint" of each Peer-to-Peer network software application and checking to see if this blueprint exists on a target computer system. Virus scanning software works in the same way, in that a blueprint of the virus is created and then checked against each file on a target computer system. Using a software blueprint to detect Peer-to-Peer network software applications is successful only if the Peer-to-Peer network software application is known and an accurate blueprint has been created. Each time a new Peer-to-Peer network software application is created a new blueprint must be created and there is an inherent lag in protection during the development of the software blueprint. Furthermore, when a Peer-to-Peer network software application is upgraded or changed because of new developments, a Peer-to-Peer network software application blueprint may no longer be valid. This leaves an organization exposed.

Inline filters detect Peer-to-Peer network usage by monitoring network communications on the organization's network and comparing the communications to known Peer-to-Peer network protocols. Using a protocol comparison method to detect Peer-to-Peer network software application only works if the Peer-to-Peer network software application's protocol is known. Each time a new Peer-to-Peer network software application is created the inline filter must be upgraded to look for the new protocol or data. Furthermore, when a Peer-to-Peer network software application is upgraded or changed because of new developments, the comparison filter that the inline filter uses may no longer be valid. Inline filters also do not work on Peer-to-Peer networks in which the communications between users is encrypted. This leaves an organization exposed.

SUMMARY OF THE INVENTION

One aspect of the present invention is directed to a system and method for detecting peer-to-peer network software operating on a target computer. A target file is created, and placed in one or more folders on the target computer. A search is issued on a Peer-to-Peer network for the target file. Peer-to-peer software is detected to be operating on the target computer in accordance with results of the search.

In specific embodiments, the target file may be placed in a plurality of folders on the target computer, and optionally contains data that uniquely identifies the target computer. The data may be encrypted, and can include an IP address of the target computer, a name of the target computer, a name of a user of the target computer, and/or an email address of a user of the target computer. The data may be entered by a network administrator or operator responsible for monitoring the target computer. The method/system may be implemented at least in part using software that executes on the target computer, or alternatively using software that executes on a computer different from the target computer. A firewall, an intrusion detection system, a router, or an application, may be automatically notified upon detection of peer-to-peer software on the target computer.

In accordance with a further aspect, the present invention is directed to a system and method for detecting peer-to-peer network participation of a first node. Network data of the first node is monitored. A search is issued for a predetermined term on a peer-to-peer network while monitoring the network data. Peer-to-peer participation of the first node in the peer-to-peer network is detected if the monitoring identifies the predetermined term being transmitted to the first node.

In specific embodiments, an administrator responsible for monitoring the first node is notified if peer-to-peer participation is detected. Blocking of data access to the first node may be automatically implemented if peer-to-peer participation is detected. In addition, peer-to-peer software associated with the first node may be automatically or manually disabled if peer-to-peer participation is detected.

DESCRIPTION OF PRESENTLY PREFERRED EMBODIMENTS

Figure 6:
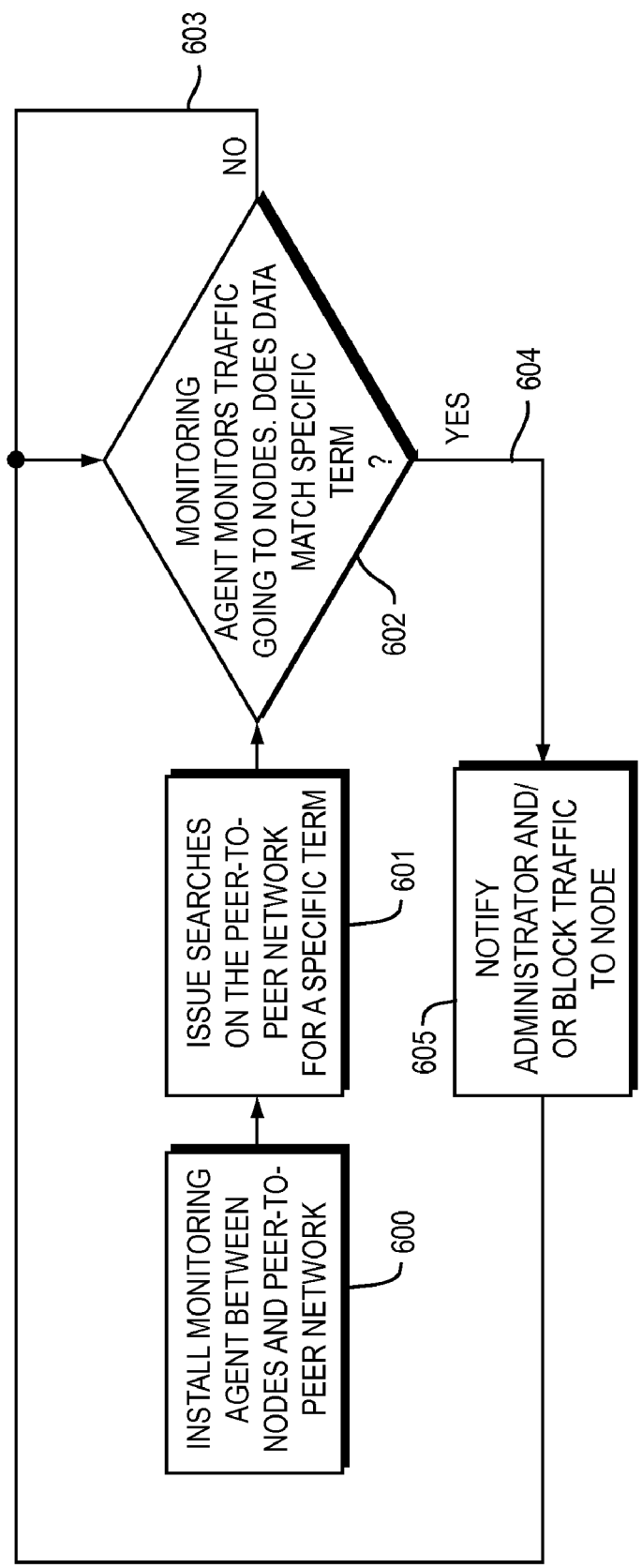
FIG. 6 is a simplified flowchart representation of another embodiment of the present invention where a monitoring agent is placed between a target system and a peer-to-peer network. A search is then initiated on the peer-to-peer network to see if the monitoring agent detects the search coming into the network.

As part of operating, nodes on a peer-to-peer network receive searches from the network for items that are being searched for by other users. If a first node receives a search and has a matching item, the first node will respond back to the searcher node. Referring to FIG. 6, in one embodiment of the present invention, administrators install (600) a monitoring agent and configure it to detect certain terms heading inbound to a node or group of nodes that they wish to protect. The monitoring agent could be a device on its own, a piece of software, embedded in a router or firewall, or other network device which passes network data or has the potential to monitor network data such as a sniffer. The monitoring agent could have the data (being monitored) pass through it, or it could receive a copy of such data. The administrators then issues (601) searches on the peer-to-peer network and see (602) if these terms get sent to any protected nodes. If the term is not detected (603) by the monitoring agent as being sent to a node that is being protected, then the administrators continue to see (602) if these terms get sent to any protected nodes. If the term is detected (604) by the monitoring agent as being sent to a node that is being protected, this would signal to the administrators that the node has peer-to-peer software. They would know this because the monitoring agent had detected the search inbound to a node so therefore the node must be part of the peer-to-peer network to receive the search. Upon detection that a node has peer-to-peer software, the monitoring agent is optionally configured to block (605) all transmissions to the node until the administrators removed the software. The monitoring agent could also be configured to notify (605) the administrators upon detection that a node has peer-to-peer software. The monitoring agent could be configured to do either of these functions (i.e., blocking/notification) automatically upon detection that a node has peer-to-peer software.

Figure 1:
FIG. 1 is a simplified schematic of a two node Peer-to-Peer network.
Figure 2:
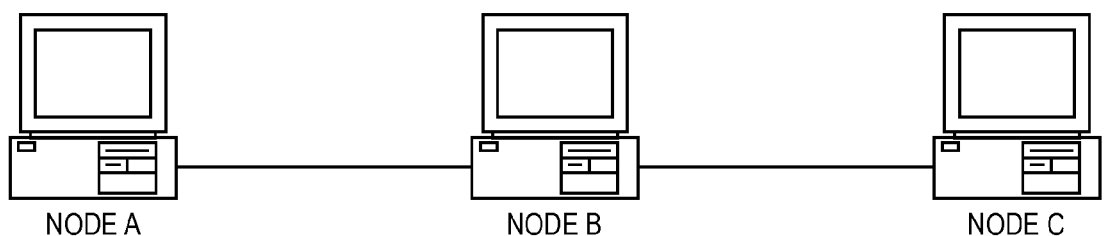
FIG. 2 is a simplified schematic of a Peer-to-Peer proxy network.
Figure 3:
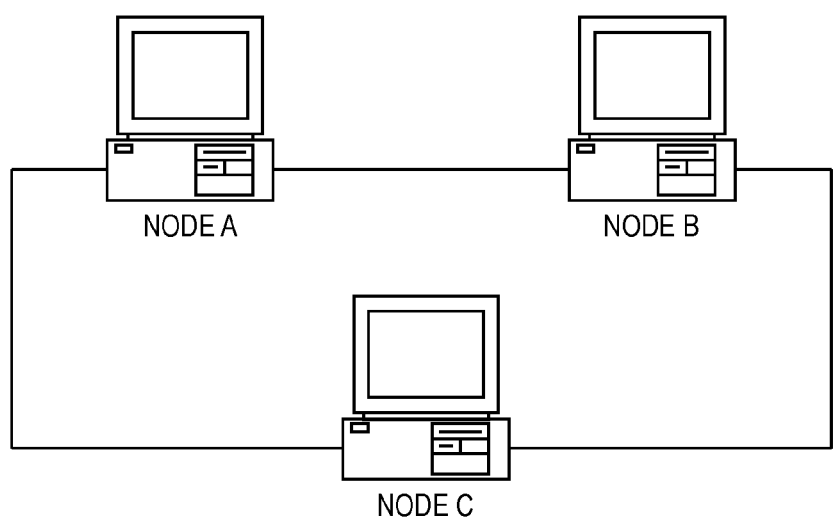
FIG. 3 is a simplified schematic view of a Peer-to-Peer, nonproxy, loop network.
Figure 4:
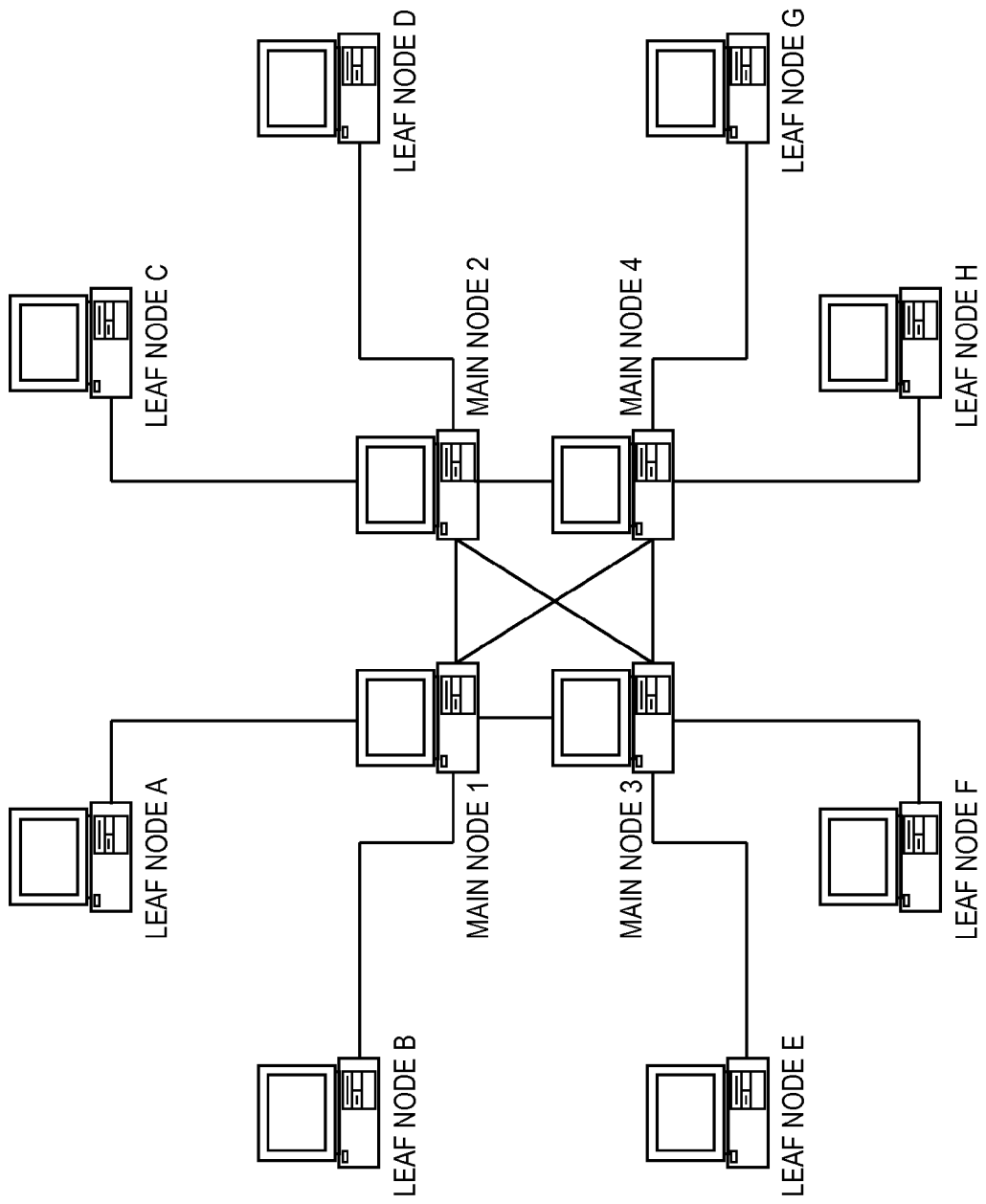
FIG. 4 is a simplified schematic of a peer to peer leaf/main node network.
Figure 5:
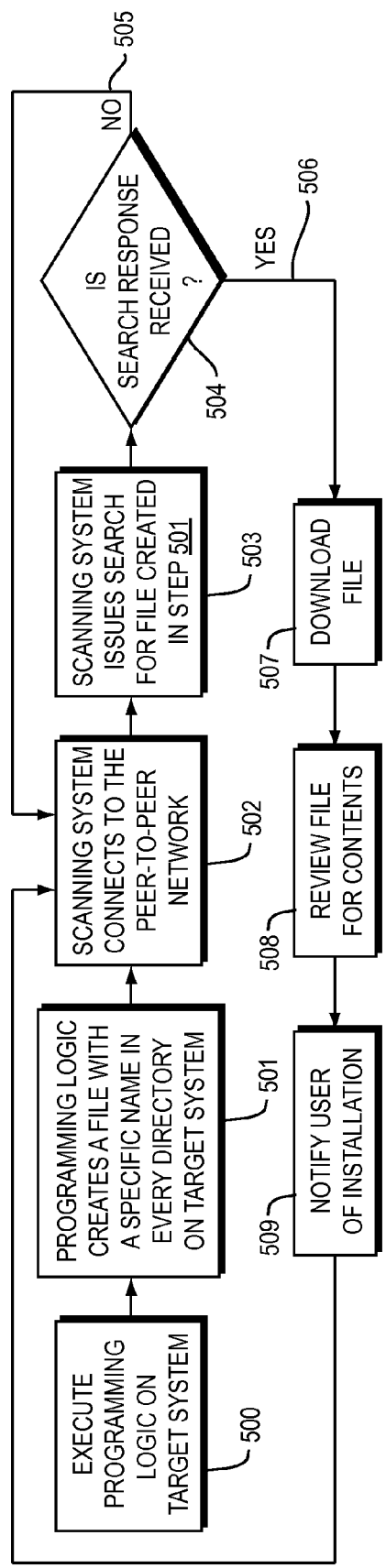
FIG. 5 is a simplified flowchart representation of one of embodiment of the present invention where a file is placed onto a target system and is then searched for via the peer-to-peer network.

Referring to FIG. 5, one embodiment of the present invention advantageously utilizes a software program to create a target file and places this target file in the folders of a target computer that is to be monitored for the purpose of detecting whether the target computer contains Peer-to-Peer network application software. The target file is preferably placed in as many folders as possible in the target computer because the "shared folder" on the target computer (to the extent one exists) is not known to the monitoring application. If the target computer has a Peer-to-Peer network software application installed, this target file will be available to be shared with other users of the Peer-to-Peer network, and an appropriate search of the Peer-to-Peer network for the target file will result in detection of the target file by a monitoring application. Once the target file or its data is detected on a Peer-to-Peer network, it can be assumed that the target computer is in some way participating in the Peer-to-Peer network and steps can be taken to remove the Peer-to-Peer network software application from the target computer. The advantages of this system compound when the monitoring application protects multiple target computers such as you would find on a corporate network. It can also be used to offer home users or consumers protection from inadvertent or malicious installation of a peer-to-peer client application.

In another embodiment, a software program is executed on the target computer. The software program creates a target file. The target file is placed into the folders of the target computer. For example, the target file is placed in as many folders as possible because the "shared folder" is not known. A search is initiated on a Peer-to-Peer network to check for the presence of the target file. If the target file is located (e.g., a node searching for the file is able to retrieve it), it can be assumed that the target is in some way participating in the Peer-to-Peer network and steps can be taken to remove the Peer-to-Peer network software application.

In another embodiment, a software program is executed (500) on a computer system that has access to one or more target systems' file systems. The software program creates (501) a target file. The data contained within this target file is information that can be used to identify the target computer(s). This is useful when there are more than one computer systems being targeted, and optionally one filename is used for ease of searching. The target file is placed into the folders of the target computer(s). For example, the target file is placed in as many folders as possible because the "shared folder" on each target computer is not known. Where there is more than one computer system being targeted, the data contained within this target file is optionally varied for each target computer. A search is initiated (503) on a Peer-to-Peer network (e.g., from a scanner system that connects (502) to the Peer-to-Peer network) to check (504) for the presence of the target file. If the target file is located (506), the file is then acquired (507) and the data reviewed (508) to identify or notify (509) the corresponding target computer.

In another embodiment, a software program is executed on the target computer. The software program creates a target file. The data contained within this target file is information that can be used to identify the target computer. This is useful when there are more than one computer system being targeted, and optionally one filename is used for ease of searching. The data that this target file includes is encrypted to protect the contents. The target file is placed into the folders of the target computer(s). For example, the target file is placed in as many folders as possible because the "shared folder" on each target computer is not known. Where there is more than one computer system being targeted, the data contained within this target file is optionally varied for each target computer. A search is initiated on a Peer-to-Peer network to check for the presence of the target file. If the target file is located (e.g., a node searching for the file is able to retrieve it), the file is then acquired. Once the file is acquired, the data contained within it is decrypted and reviewed to identify the corresponding target computer.

In another embodiment, a software program is executed on a computer system that has access to a target system's file systems. The software program creates a target file. The target file is placed into the folders of the target computer (i.e., the computer that is to be monitored for the purpose of detecting whether the target computer contains Peer-to-Peer network application software). For example, the target file is placed in as many folders as possible because the "shared folder" is not known. A search is initiated on a Peer-to-Peer network to check for the presence of the target file. If the target file is located (e.g., a node searching for the file is able to retrieve it), it can be assumed that the target computer is in some way participating in the Peer-to-Peer network and steps can be taken to remove the Peer-to-Peer network software application from the target computer.

In another embodiment, a target file is placed into the folders of the target computer. The target file is placed in as many folders as possible because the "shared folder" is not known. A search is initiated on a Peer-to-Peer network to check for the presence of the target file. If the target file is located (e.g., a node searching for the file is able to retrieve it), it can be assumed that the target is in some way participating in the Peer-to-Peer network and steps can be taken to remove the Peer-to-Peer network software application from the target computer.

In another embodiment, a software program is executed on a computer system that has access to one or more target systems' file systems. The software program creates a target file. The data contained within this target file is information that can be used to identify the target computer(s). This is useful when there are more than one computer systems being targeted, and optionally one filename is used for ease of searching. The target file is placed into the folders of the target computer(s). For example, the target file is placed in as many folders as possible because the "shared folder" on each target computer is not known. Where there is more than one computer system being targeted, the data contained within this target file is optionally varied for each target computer. A search is initiated on a Peer-to-Peer network to check for the presence of the target file. If the target file is located, the file is then acquired and the data reviewed to identify the corresponding target computer.

In another embodiment, a software program is executed on a computer system that has access to one or more target systems' file systems. The software program creates a target file. The data contained within this target file is information that can be used to identify the target computer(s). This is useful when there are more than one computer system being targeted, and optionally one filename is used for ease of searching. The data that this target file includes is encrypted to protect the contents. The target file is placed into the folders of the target computer(s). For example, the target file is placed in as many folders as possible because the "shared folder" on each target computer is not known. Where there is more than one computer system being targeted, the data contained within this target file is optionally varied for each target computer. A search is initiated on a Peer-to-Peer network to check for the presence of the target file. If the target file is located, the file is then acquired. Once the file is acquired, the data contained within it is decrypted and reviewed to identify the corresponding target computer.

In yet another embodiment, a target file is placed onto a target system and a search is initiated via the peer-to-peer network for the target file. If the file is detected notification occurs. For example, an administrator responsible for monitoring the target computer is sent an electronic communication informing the administrator that the target computer is operating a peer-to-peer network software application.

In yet another embodiment, a target file is placed onto a target system. A monitoring agent is placed between the target system and the peer-to-peer network. A search is initiated via the peer-to-peer network for the target file. If the file is detected by the monitoring agent, then notification occurs. For example, an administrator responsible for monitoring the target computer is sent an electronic communication informing the administrator that the target computer is operating a peer-to-peer network software application. Optionally the monitoring agent automatically disables access to the node that has peer-to-peer software (i.e., the target system).

In yet another embodiment, a monitoring agent is placed between the target system and the peer-to-peer network. A search is initiated for a specific term via the peer-to-peer network. The monitoring agent is configured to monitor data inbound to nodes it is configured to protect (e.g., the target system). If the monitoring agent detects the specific term it will assume that the target system has peer-to-peer software, and automatically disable access to the target system.

In yet another embodiment, a monitoring agent is placed between the target computer and the peer-to-peer network. This monitoring agent could be a device on its own, embedded in a router or firewall, or other network device which passes network data. A software program is executed on the target computer. The software program creates a target file. The target file is placed into the folders of the target computer. For example, the target file is placed in as many folders as possible because the "shared folder" is not known. A search is initiated on a Peer-to-Peer network to check for the presence of the target file. If the monitoring agent detects the search string for the file the monitoring agent automatically blocks traffic to and from the target computer to prevent network access.

In yet another embodiment, a monitoring agent is placed between the target computer and the peer-to-peer network. This monitoring agent could be a device on its own, embedded in a router or firewall, or other network device which passes network data. A software program is executed on one or more target computers. The software program creates a target file. The data contained within this target file is information that can be used to identify the target computer. This is useful when there are more than one computer system being targeted, and optionally one filename is used for ease of searching. The data that this target file includes is encrypted to protect the contents. The target file is placed into the folders of the target computer(s). For example, the target file is placed in as many folders as possible because the "shared folder" is not known. Where there is more than one computer system being targeted, the data contained within this target file is optionally varied for each target computer. A search is initiated on a Peer-to-Peer network to check for the presence of the target file. If the target file is located, the file is then acquired. Once the file is acquired, the data contained within it is decrypted and reviewed to identify the corresponding target computer. The searching system then notifies the monitoring agent which automatically blocks traffic to and from the identified target computer(s) to prevent network access.

In yet another embodiment, a corporate network is protected by placing a target file in the folders of the computers located on the network, optionally changing the name of each file, or optionally encrypting the data contained within it. The file(s) are searched for on a Peer-to-Peer network, and if the file is detected it is optionally downloaded. Administrators or the user could then be notified.

In one embodiment, the invention is implemented in a computer system that contains a processor unit, main memory, and an interconnect bus. The processor unit may contain a single microprocessor, or may contain a plurality of microprocessors for configuring the computer as a multi-processor system. The main memory stores, in part, instructions and data for execution by the processor unit. If the ability of the inventive system is wholly or partially implemented in software, the main memory may be used to store the executable code when in operation. The main memory may include banks of dynamic random access memory as well as high speed memory.

The computer system may further include a mass storage device, peripheral devices, portable storage medium drives, input control device, a graphics subsystem, and an output display. The computer system may be connected through one or more data transport means. For example, the processor unit and the main memory may be connected via a local microprocessor bus, and the mass storage device, peripheral devices, portable storage medium drives, graphics subsystem may be connected via one or more input/output (I/O) busses. The mass storage device, which may be implemented with a magnetic disk drive or an optical disk drive, is nonvolatile storage device for storing data and instructions for use by the processor unit. In a software embodiment, the mass storage device stores the software for loading to the main memory.

The input control device(s) provide a portion of the user interface for a user of the computer system. The input control devices may include an alpha numeric keypad for inputting alphanumeric and other key information, a cursor control device, such as a mouse, a trackball, a stylus, or cursor direction keys. In order to display textual and graphical information, the computer system contains the graphics subsystem and the output display. The output display may include a cathode ray tube display or a liquid crystal display. The graphics subsystem receives textual and graphical information and processes the information for output to the output display.

The components contained in the computer system are those typically found in general purpose computer systems, and in fact, these components are intended to represent a broad category of such computer components that are well known in the art.

The system may be implemented in either hardware or software. For some software embodiments, the software includes a plurality of computer executable instructions for implementation on a general purpose computer system. Prior to loading into a general purpose computer system, the system may reside as encoded information on a computer readable medium, such as a magnetic floppy disc, magnetic tape compact disc read only memory (CD-ROM). In one hardware embodiment, the system may comprise a dedicated processor including processor instructions for performing the functions described herein. Circuits may also be developed to perform the functions described herein.

EXAMPLES

The following Examples illustrate various embodiments of systems according to the present Invention.

Example 1

This example illustrates a system for detecting Peer-to-Peer software applications by creating a specific target file, placing this target file in the folders of a target computer, and searching for this target file on a Peer-to-Peer network.

In this example, a user has installed a Peer-to-Peer software application onto computer system #1. A network administrator wishes to identify if this computer system has a Peer-to-Peer software application installed. The network administrator executes the detection software. The detection software creates a file named, "123456.txt" and places this file in every folder of computer system #1. The network administrator then issues a search on a Peer-to-Peer network for "123456.txt." The network administrator locates a file named, "123456.txt." The network administrator now knows that computer system #1 has a Peer-to-Peer network software application installed.

Example 2

This example illustrates a system for a detecting Peer-to-Peer software application by creating a specific target file with specific data, placing this target file in the folders of a target computer, and searching for this target file on a Peer-to-Peer network.

In this example, a user has installed a Peer-to-Peer software application onto computer system #1 which has an IP address of 192.168.0.1. A network administrator wishes to identify if this computer system has a Peer-to-Peer software application installed thereon. The network administrator executes the detection software. The detection software creates a file named, "123456.txt." with the contents of this file being the IP address of computer system #1. The detection software places this file in every folder of computer system #1. The network administrator then issues a search on a Peer-to-Peer network for "123456.txt." The network administrator locates a file named, "123456.txt." The network administrator acquires the file and reviews the data. The IP address within the file is "192.168.0.1." The network administrator now knows that computer system #1 has a Peer-to-Peer network software application installed thereon.

Example 3

This example illustrates a system for detecting a Peer-to-Peer software application on multiple computer systems by creating a specific target file with specific data, placing this target file in the folders of a target computer, and searching for this target file on a Peer-to-Peer network.

In this example there are five computer systems on a network:
Computer system #1 with an IP address of 192.168.0.1
Computer system #2 with an IP address of 192.168.0.2
Computer system #3 with an IP address of 192.168.0.3
Computer system #4 with an IP address of 192.168.0.4
Computer system #5 with an IP address of 192.168.0.5

The network administrator wishes to identify if any of these computer systems have a Peer-to-Peer network software application installed thereon. One or more users have installed a Peer-to-Peer software application onto computer system #1 and computer system #3. The network administrator executes the detection software on each computer system. The detection software on each computer system creates a file named, "12456.txt." with the contents of this file being the IP address of the corresponding computer system. The detection software places this file in every folder of the corresponding computer system. The network administrator then issues a search on a Peer-to-Peer network for "12456.txt." The network administrator locates two files named, "12456.txt." The network administrator acquires these file and reviews the data. The IP address within file #1 is "192.168.0.1" and the IP address within file #2 is "192.168.0.3." The network administrator now knows that computer system #1 and computer system #3 have a Peer-to-Peer network software application installed thereon.

Example 4

This example illustrates a system for detecting a Peer-to-Peer software application on the computers of a network which share the same IP addresses by creating a specific target file with specific data, placing this file in the folders of a target computer, and searching for this file on a Peer-to-Peer network.

In this example there is a corporate network that includes two remote offices. Each remote office network has two computer systems. Each computer system has a unique computer name. Each remote office utilizes an IP address scheme that is the same as the other. The resulting IP addresses are:
Remote Office #1, Computer System #1: COMPA, 192.168.0.1
Remote Office #1, Computer System #2: COMPB, 192.168.0.2
Remote Office #2, Computer System #1: COMPC, 192.168.0.1
Remote Office #2, Computer System #2: COMPD, 192.168.0.2

One or more users have installed a Peer-to-Peer software application on computer system #1 in remote office #1 and on computer system #2 in remote office #2. A network administrator wishes to identify if any computer system on either remote office network has a Peer-to-Peer software application installed thereon. The network administrator executes the detection software on all computer systems on both remote office networks. The detection software on each computer system creates a file named, "12456.txt." with the contents of this file being the IP address and name of the corresponding computer system. The detection software places this file in every folder of the corresponding computer system. The network administrator then issues a search on a Peer-to-Peer network for "12456.txt." The network administrator locates two files named, "12456.txt." The network administrator acquires these file and reviews the data. The IP address within file #1 is "192.168.0.1" and the IP address within file #2 is "192.168.0.2." The name in file #1 is "COMPA" and the name in file #2 is "COMPD." The network administrator now knows that computer system #1 in remote office #1 and computer system #2 in remote office #2 have a Peer-to-Peer network software application installed thereon.

Example 5

This example illustrates a secure system for detecting a Peer-to-Peer software application on multiple computer systems by creating a specific target file with specific data, encrypting this data, placing this file in the folders of a target computer, and searching for this file on a Peer-to-Peer network.

In this example, there are five computer systems on a network:
Computer system #1 with an IP address of 192.168.0.1
Computer system #2 with an IP address of 192.168.0.2
Computer system #3 with an IP address of 192.168.0.3
Computer system #4 with an IP address of 192.168.0.4
Computer system #5 with an IP address of 192.168.0.5

The network administrator wishes to identify in a secure manner if any of these computer systems have a Peer-to-Peer network software application installed thereon. One or more users have installed a Peer-to-Peer software application onto computer system #1 and computer system #3. The network administrator executes the detection software on each computer system. The detection software on each computer system creates a file named, "12456.txt." with the contents of this file being the IP address of the corresponding computer system. The detection software encrypts the contents of the file. The detection software places this file in every folder of the corresponding computer system. The network administrator then issues a search on a Peer-to-Peer network for "12456.txt." The network administrator locates two files named, "12456.txt." The network administrator acquires these files, decrypts the data, and reviews the data. The IP address within file #1 is "192.168.0.1" and the IP address within file #2 is "192.168.0.3." The network administrator now knows that computer system #1 and computer system #3 have a Peer-to-Peer network software application installed thereon.

Finally, it will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed is:

1. A method for detecting peer-to-peer network software operating on a target computer, comprising:
   a. creating a target file, and placing the target file in one or more folders on the target computer;
   b. locating the target file on a Peer-to-Peer network independent of the target computer responding to a search issued on the Peer-to-Peer network for the target file; and
   c. detecting a peer-to-peer software operating on the target computer in an event the target file is located on the Peer-to-Peer network.

2. The method of claim 1, wherein the target file is placed in a plurality of folders on the target computer.

3. The method of claim 1, wherein the target file contains data that uniquely identifies the target computer.

4. The method of claim 3, wherein the data is encrypted.

5. The method of claim 3, wherein the data includes an IP address of the target computer.

6. The method of claim 3, wherein the data contains a name of the target computer.

7. The method of claim 3, wherein the data contains a name of a user of the target computer.

8. The method of claim 3, wherein the data contains an email address of a user of the target computer.

9. The method of claim 3, wherein the data contains information entered by a network administrator or operator responsible for monitoring the target computer.

10. The method of claim 1, wherein the method is implemented at least in part using software that executes on the target computer.

11. The method of claim 1, wherein the method is implemented at least in part using software that executes on a computer different from the target computer.

12. The method of claim 1, further comprising: notifying at least one of a firewall, an intrusion detection system, a router, or an application, that peer-to-peer software has been detected, wherein the notification is performed based in accordance with an output of the detecting step.

13. A system for detecting peer-to-peer network software operating on a target computer comprising:
   a storage medium for storing instructions; and
   a user input device for receiving user input; and
   a processor unit operable to process the user input and to use the instructions to:
      create a target file;
      place the target file in one or more folders on the target computer;
      locate the target file on a Peer-to-Peer network independent of the target computer responding to a search issued on a Peer-to-Peer network for the target file; and
      detect whether peer-to-peer software is operating on the target computer in an event the target file is located on the Peer-to-Peer network.

14. The system of claim 13, wherein the processor unit is operable to process the user input and to use the instructions to place the target file in a plurality of folders on the target computer.

15. The system of claim 14, wherein the target file contains data that uniquely identifies the target computer.

16. The system of claim 15, wherein the data is encrypted.

17. The system of claim 15, wherein the data includes an IP address of the target computer.

18. The system of claim 15, wherein the data contains a name of the target computer.

19. The system of claim 15, wherein the data contains a name of a user of the target computer.

20. The system of claim 15, wherein the data contains an email address of a user of the target computer.

21. The system of claim 15, wherein the data contains information entered by a network operator or administrator responsible for monitoring the target computer.

22. The system of claim 13, wherein the system is implemented using software that executes at least in part on the target computer.

23. The system of claim 13, wherein the system is implemented using software that executes at least in part on a computer different from the target computer.

24. The system of claim 13, wherein the processor unit automatically notifies at least one of a firewall, an intrusion detection system, a router, or an application, upon detection of peer-to-peer software.

25. A system for the detection of one or more Peer-to-Peer network software applications operating on a target computer, comprising:
   a. means for creating a target file, and placing the target file in one or more folders on the target computer;
   b. means for locating the target file on a Peer-to-Peer network independent of the target computer responding to a search issued on a Peer-to-Peer network for the target file; and
   c. means for detecting whether peer-to-peer software is operating on the target computer in an event the target file is located on the Peer-to-Peer network.

26. The system of claim 25, wherein the target file is placed in a plurality of folders on the target computer.

27. The system of claim 25, wherein the target file contains data that uniquely identifies the target computer.

28. A method executed by a monitoring agent on a peer-to-peer network for detecting peer-to-peer network participation of a first node, comprising:
   a. monitoring network data sent to the first node; and
   b. issuing a search for a predetermined term on a peer-to-peer network while monitoring the network data sent to the first node;
   c. detecting peer-to-peer participation of the first node in the peer-to-peer network if the monitoring identifies the the search being sent to the first node, the detecting being independent of the first node receiving the issued search.

29. The method of claim 28, further comprising notifying an administrator responsible for monitoring the node if peer-to-peer participation is detected.

30. The method of claim 28, further comprising automatically blocking data access to the first node if peer-to-peer participation is detected.

31. The method of claim 28, further comprising disabling peer-to-peer software associated with the first node if peer-to-peer participation is detected.

32. The method of claim 28, wherein the first node resides on a corporate computer network.

33. The method of claim 28, wherein the first node resides on a home computer network.

34. A system for detecting peer-to-peer network participation, comprising:
 a. means for monitoring network data sent to the first node;
 b. means for issuing a search for a predetermined term on a peer-to-peer network while the means for monitoring the network data monitors the network data sent to the first node; and
 c. means for detecting peer-to-peer participation of the first node in the peer-to-peer network if the means for monitoring identifies the the search being sent to the first node, the detecting means being independent of the first node receiving the issued search.

* * * * *